(12) United States Patent
Mohammad et al.

(10) Patent No.: US 11,143,559 B2
(45) Date of Patent: Oct. 12, 2021

(54) SENSOR WELL FOR HVAC UNIT

(71) Applicant: Johnson Controls Technology Company, Auburn Hills, MI (US)

(72) Inventors: Mujibul R. Mohammad, Kakinada (IN); Vishal S. Jagtap, Thane (IN); Ravindra B. Salunkhe, Nagthane (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 175 days.

(21) Appl. No.: 16/047,809

(22) Filed: Jul. 27, 2018

(65) Prior Publication Data

US 2020/0011740 A1   Jan. 9, 2020

Related U.S. Application Data

(60) Provisional application No. 62/694,309, filed on Jul. 5, 2018.

(51) Int. Cl.
| | |
|---|---|
| *F24F 1/22* | (2011.01) |
| *G01K 1/143* | (2021.01) |
| *F25D 29/00* | (2006.01) |
| *F24F 11/30* | (2018.01) |

(52) U.S. Cl.
CPC ............ *G01K 1/143* (2013.01); *F24F 1/22* (2013.01); *F24F 11/30* (2018.01); *F25D 29/005* (2013.01)

(58) Field of Classification Search
CPC ............................. G01K 2201/00; G01K 1/14
See application file for complete search history.

(56) References Cited

U.S. PATENT DOCUMENTS

| | | | |
|---|---|---|---|
| 6,766,993 B2 | 7/2004 | Rasmussen et al. | |
| 6,814,486 B2 | 11/2004 | Sidoni | |
| 7,553,078 B2* | 6/2009 | Hanzawa | G01K 1/08 338/22 R |
| 8,523,432 B2* | 9/2013 | Mujumdar | G01K 1/14 374/208 |
| 8,702,303 B2* | 4/2014 | Farago | G01K 1/026 374/141 |
| 9,207,130 B2* | 12/2015 | Mori | G01K 13/02 |
| 9,644,887 B2 | 5/2017 | Chung et al. | |
| 2007/0104247 A1* | 5/2007 | Takahashi | G01K 1/08 374/185 |
| 2008/0008227 A1 | 1/2008 | Jang et al. | |
| 2009/0168842 A1* | 7/2009 | Yokoi | G01K 1/12 374/208 |

(Continued)

FOREIGN PATENT DOCUMENTS

JP       2010139159 A      6/2010

*Primary Examiner* — Filip Zec
(74) *Attorney, Agent, or Firm* — Fletcher Yoder, P.C.

(57) ABSTRACT

Embodiments of the present disclosure are directed to a sensor well system that includes a mounting tube and a clip disposed within the mounting tube and configured to engage with a sensor to secure the sensor within the mounting tube, where the clip is formed from a band of flexible material. The clip includes a curved end portion configured to receive an end portion of the sensor and at least one protrusion disposed along a length of the band outside of the curved end portion such that the at least one protrusion is configured to abut a side of the sensor when the sensor is installed within the sensor well system.

24 Claims, 16 Drawing Sheets

(56) References Cited

U.S. PATENT DOCUMENTS

| | | | | |
|---|---|---|---|---|
| 2011/0228812 A1* | 9/2011 | Suzuki | .................. | B23K 26/22 |
| | | | | 374/163 |
| 2015/0233769 A1* | 8/2015 | Ishikawa | .................. | G01K 1/14 |
| | | | | 374/185 |

* cited by examiner

SENSOR WELL FOR HVAC UNIT

CROSS REFERENCE TO RELATED APPLICATIONS

This application claims priority from and the benefit of U.S. Provisional Application Ser. No. 62/694,309, entitled "SENSOR WELL FOR HVAC UNIT," filed Jul. 5, 2018, which is hereby incorporated by reference in its entirety for all purposes.

BACKGROUND

The present disclosure relates generally to environmental control systems, and more particularly, to a sensor well for a heating, ventilation, and air conditioning (HVAC) unit.

Environmental control systems are utilized in residential, commercial, and industrial environments to control environmental properties, such as temperature and humidity, for occupants of the respective environments. The environmental control system may control the environmental properties through control of an airflow delivered to the environment. In some cases, heating, ventilation, and air conditioning (HVAC) systems include sensors for monitoring various operating parameters of the HVAC system. For instance, the HVAC system may include temperature sensors configured to provide feedback indicative of a temperature of a fluid circulating through the HVAC system. In existing HVAC systems, mounting devices for sensors may incur wear, thereby enabling the sensor to change positions relative to the HVAC system and components of the HVAC system. The shifting of the position of the sensor may cause the sensor to provide inaccurate feedback, which may reduce an efficiency of the HVAC system.

DRAWINGS

SUMMARY

Figure 1:
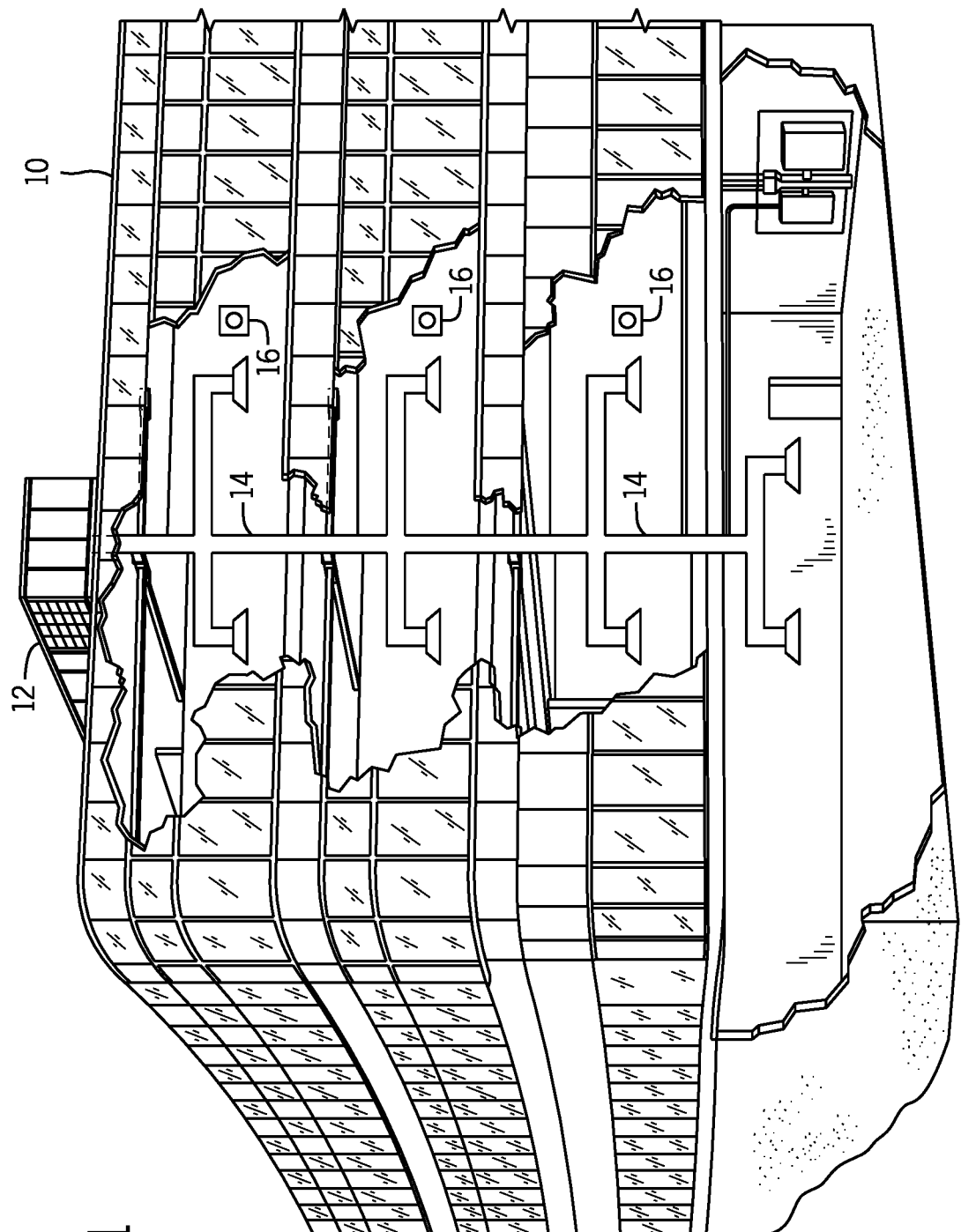
FIG. 1 is a schematic of an environmental control for building environmental management that may employ an HVAC unit, in accordance with an aspect of the present disclosure.

In one embodiment of the present disclosure, a sensor well system includes a mounting tube and a clip disposed within the mounting tube and configured to engage with a sensor to secure the sensor within the mounting tube, where the clip is formed from a band of flexible material. The clip includes a curved end portion configured to receive an end portion of the sensor and at least one protrusion disposed along a length of the band outside of the curved end portion such that the at least one protrusion is configured to abut a side of the sensor when the sensor is installed within the sensor well system.

In another embodiment of the present disclosure, a sensor well for a heating and cooling system includes a mounting tube configured to couple to a component of the heating and cooling system, a sensor disposed in the mounting tube, and a fastener configured extend through a wall of the mounting tube to secure the sensor within the mounting tube via frictional engagement with a surface portion of the sensor.

In a further embodiment of the present disclosure, a heating and cooling system includes a conduit configured to contain a working fluid of the heating and cooling system, a mounting tube configured to couple to the conduit, a sensor disposed in the mounting tube, where the sensor is configured to provide feedback indicative of an operating parameter of the working fluid in the conduit to a control system, and a clip or a fastener configured to secure the sensor within the mounting tube, where the clip includes a curved portion configured to engage an end portion of the sensor and a protrusion configured to abut a side portion of the sensor.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to a sensor well configured to secure a sensor to a component of a heating, ventilation, and air conditioning (HVAC) system, such as a conduit or a copper pipe. Existing HVAC systems may include sensors or sensing devices configured to provide feedback indicative of operating conditions of the HVAC system. For example, HVAC systems generally include a temperature sensor that is configured to monitor a temperature of a working fluid of the HVAC system. In some cases, the temperature sensor is mounted to a conduit, such as a copper pipe, of the HVAC system. The sensor mounting equipment of existing HVAC systems may wear over time, such that the sensor shifts positions with respect to the component of the HVAC system. Accordingly, the sensor may no longer provide accurate feedback indicative of the operating parameter to be measured, such as the temperature of the working fluid, which may reduce an efficiency of the HVAC system. Further, existing HVAC systems may utilize mounting components that are customized to fit on a specific component of the HVAC system based on a size of the component. Therefore, a single mounting component or mounting component system may not be suitable for each location where a sensor may be positioned. Further still, in some cases, sensors of existing HVAC systems are exposed to an ambient environment. As such, humidity, rain, and/or other environmental conditions may interfere with operation of the sensors.

Embodiments of the present disclosure are related to an improved sensor well configured to be disposed on a component of the HVAC system and to secure a sensor to the component of the HVAC system. For example, some embodiments include a mounting tube that is brazed or otherwise coupled to a component of the HVAC system, such as a conduit or a copper pipe. A sensor or sensing device may be disposed within the mounting tube and secured to the mounting tube via a securement component, such as a fastener or a clip. Accordingly, the sensor or sensing device may be at least partially covered and protected from the surrounding environment by the mounting tube, which may enhance operation, such as measurement accuracy, of the sensor or sensing device. Further, a thermally conductive gel may be disposed in a gap between an inner surface of the mounting tube and the sensor to further isolate the sensor or sensing device from the ambient environment. In some embodiments, the mounting tube may include a pinched or crimped end to further block or restrict movement of the sensor with respect to the mounting tube. In other embodiments, an additional securement component, such as an additional fastener, may be included to further block or restrict movement of the sensor with respect to the mounting tube. In still further embodiments, a clamp may be disposed within the mounting tube to block or restrict movement of the sensor with respect to the mounting tube. In any case, embodiments of the present disclosure are configured to substantially maintain a position of a sensor with respect to a component of the HVAC system.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
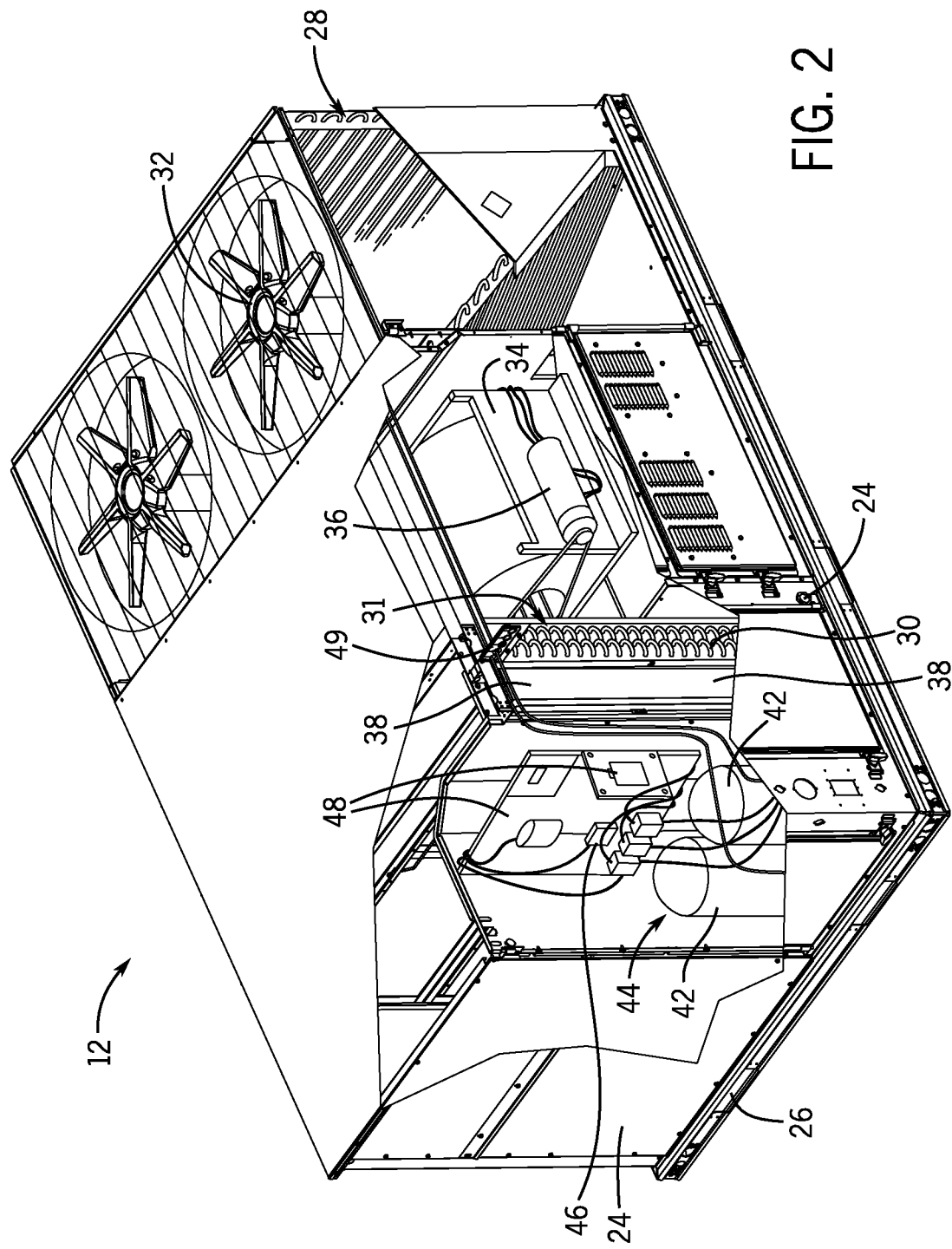
FIG. 2 is a perspective view of an embodiment of an HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits.

Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
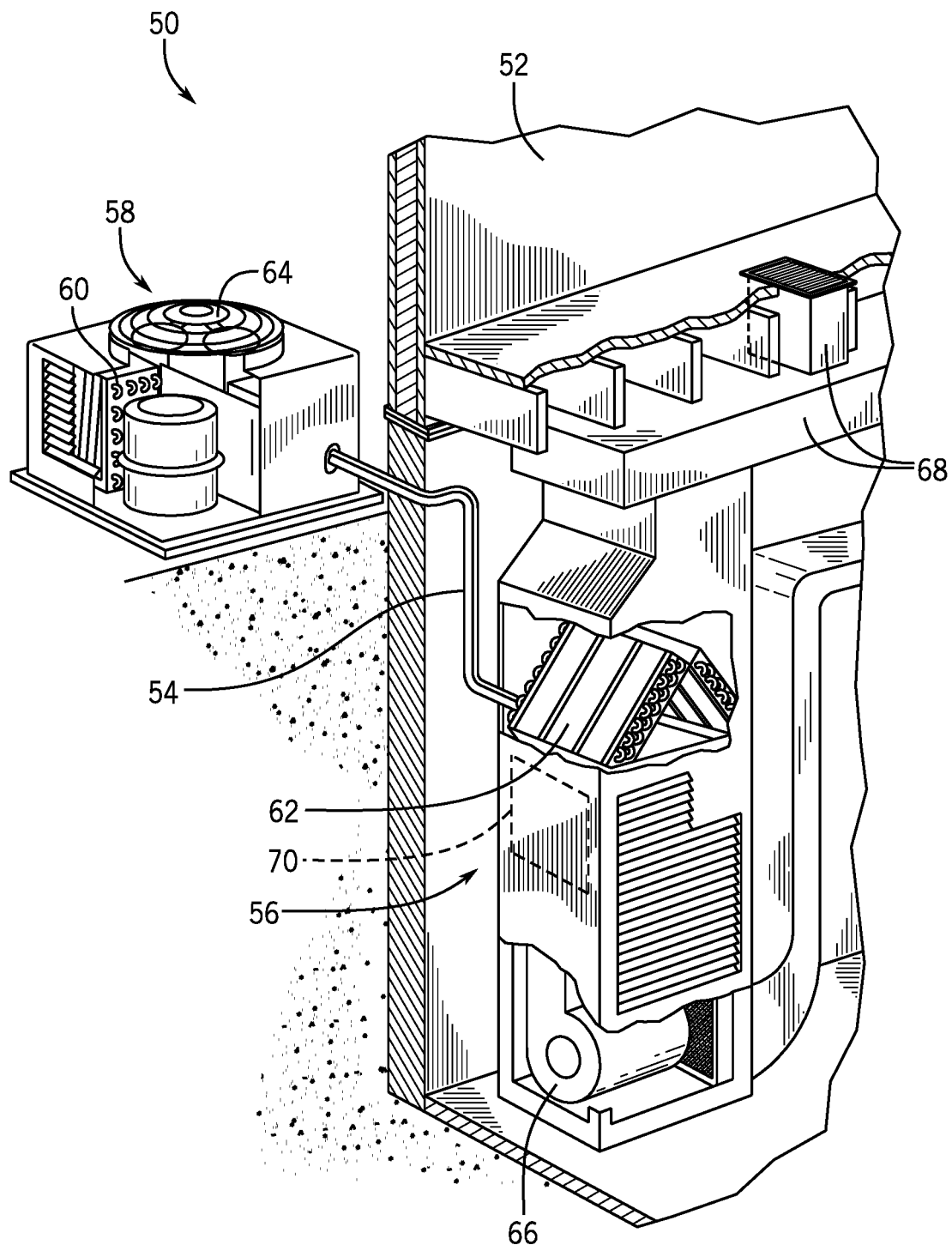
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54, such as copper pipes or tubes, that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54, such as copper pipes or tubes, transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54, such as a copper pipe or tube. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
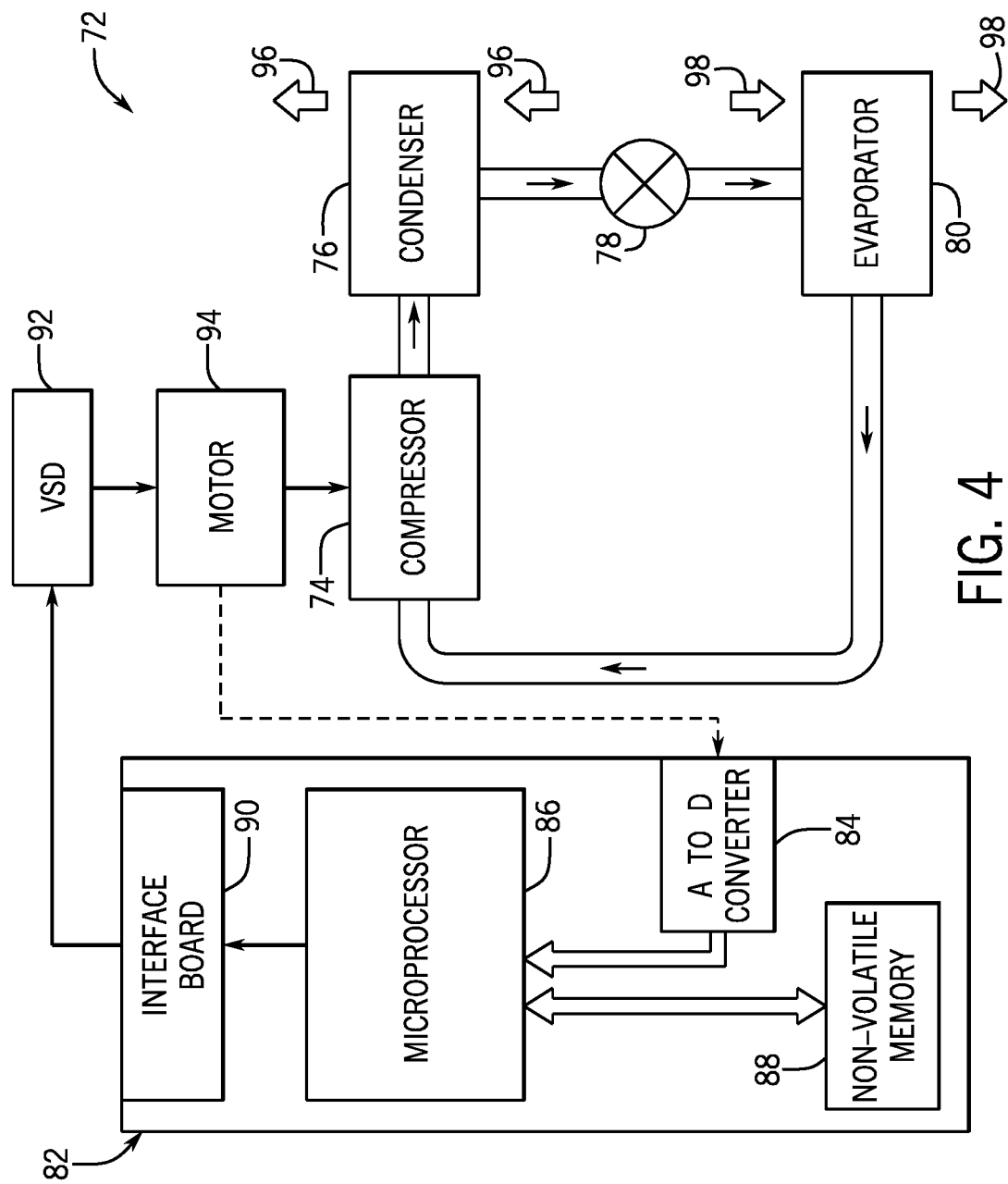
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, embodiments of the present disclosure are directed to an enhanced sensor well configured to be mounted on a component of an HVAC system, such as a conduit or copper pipe of the HVAC unit 12 and/or the residential heating and cooling system 50. The sensor well is configured to be coupled to any size component of the HVAC system without significant modification. Further, the sensor well may at least partially cover and protect a sensor or sensing device from environmental conditions that may be present around the HVAC system, such as rain or humidity. For example, the sensor well may include a mounting tube and a sensor disposed within the mounting tube. The mounting tube may thus at least partially cover or surround the sensor and block rain and/or other contaminants from substantially interfering with the position and operation of the sensor. Further still, the sensor well may include securement features that are configured to block or restrict movement of the sensor with respect to the mounting tube, such that a position of the sensor within the mounting tube and relative to the component of the HVAC system to which it is mounted is substantially maintained over time. In some cases, the securement features include fasteners, pinched or crimped portions of the mounting tube, a clamp, another suitable securement feature, or any combination thereof. In any case, the sensor well secures the sensor to the component of the HVAC system, such as a conduit or copper pipe, facilitates installation of the sensor to a desired location, and at least partially protects the sensor from environmental conditions, such as humidity and rain.

Figure 5:
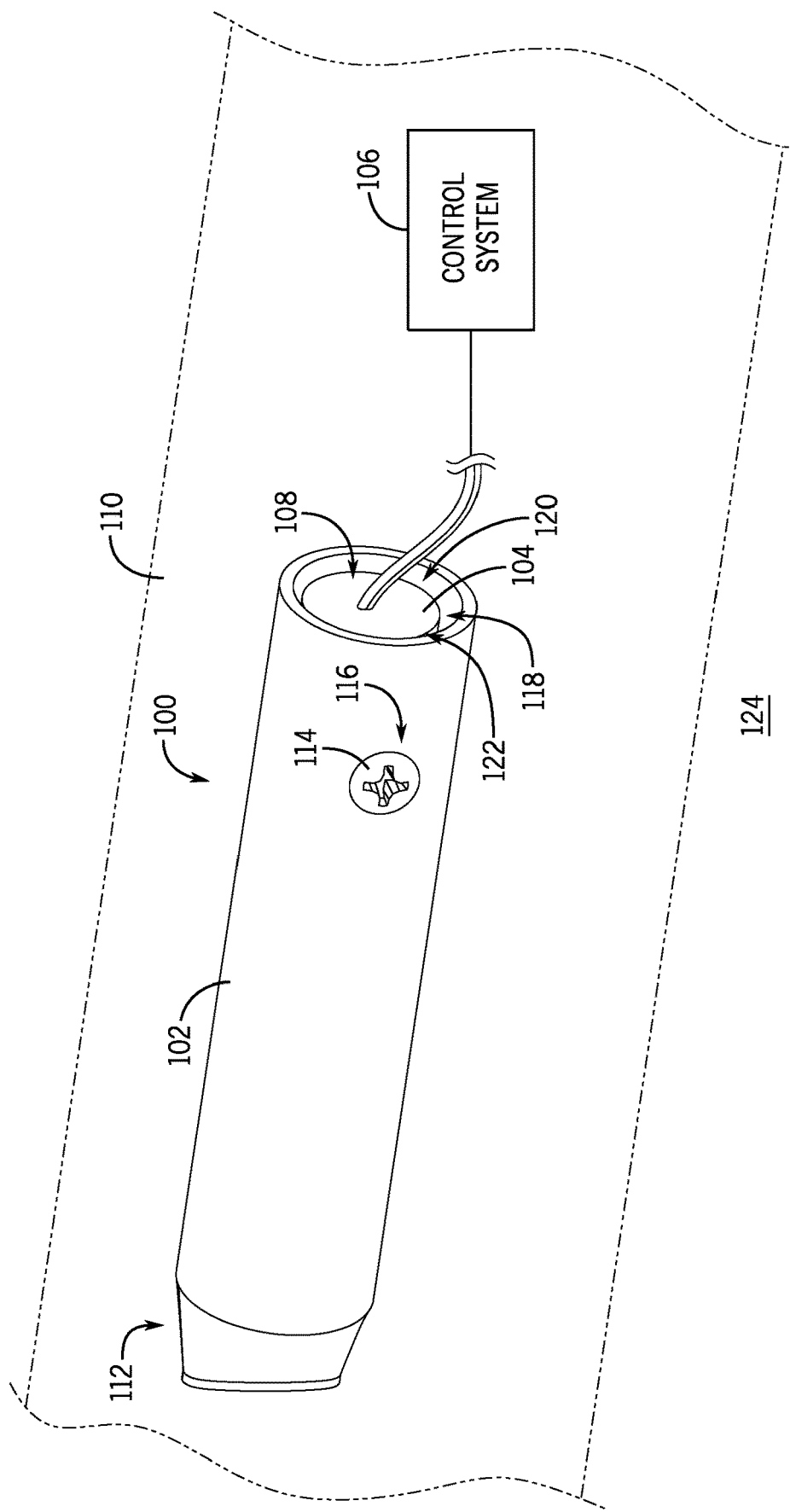
FIG. 5 is a perspective view of an embodiment of a sensor well for the systems of FIGS. 1-3, in accordance with an aspect of the present disclosure.

For example, FIG. 5 is a perspective view of an embodiment of a sensor well 100 that may be utilized in the HVAC unit 12 and/or the residential heating and cooling system 50. As shown in the illustrated embodiment of FIG. 5, the sensor well 100 includes a mounting tube 102 configured to receive a sensing device 104, such as a sensor. As used herein, the sensing device 104 may include any component configured to provide feedback indicative of an operating condition of the HVAC unit 12 and/or the residential heating and cooling system 50 to a control system 106, such as the control board 48 and/or the control panel 82 described above. For instance, the sensing device 104 may include a temperature sensor, such as a thermocouple, a thermometer, a thermistor, a resistance temperature sensor, a semiconductor-based temperature sensor, or a combination thereof. In other embodiments, the sensing device 104 may include other types of sensors configured to measure other operating parameters of the HVAC system. In any case, the sensing device 104 is disposed within an opening 108 of the mounting tube 102, and the mounting tube 102 is coupled to a component 110 of an HVAC system, such as the HVAC unit 12 and/or the residential heating and cooling system 50. In some embodiments, the mounting tube 102 includes a copper material and is brazed to a surface of the component 110. In other embodiments, the mounting tube 102 may include another suitable material and may be coupled to the component 110 via fasteners, a weld, an adhesive, and/or another suitable technique. As such, the sensing device 104 may be positioned proximate to the component 110 to monitor an operating parameter, such as temperature, of the component 110 and/or a working fluid flowing within the component 110.

In some embodiments, the mounting tube 102 includes a pinched or crimped end 112. The pinched end 112 may block or restrict movement of the sensing device 104 with respect to the mounting tube 102. For example, the sensing device 104 may be disposed into the opening 108 and may abut the pinched or crimped end 112 of the mounting tube 102. Further, the sensing device 104 may be secured within the opening 108 of the mounting tube 102 by a fastener 114. The fastener 114 may include a screw, a bolt, a rivet, another suitable fastener, or any combination thereof. In some embodiments, the fastener 114 is disposed in an opening 116 within the mounting tube 102 that includes threads, such that the fastener 114 may be tightened against the sensing device 104 to block or restrict movement of the sensing device 104 with respect to the mounting tube 102. Further still, a thermal fluid may be disposed within a gap 118 formed between an inner surface 120 of the mounting tube 102 and an outer surface 122 of the sensing device 104. The thermal fluid may facilitate thermal energy transfer between the mounting tube 102, the sensing device 104, and/or the component 110, while at least partially isolating the sensing device 104 from an environment 124 surrounding the mounting tube 102. As such, accuracy of the feedback provided by the sensing device 104 to the control system 106 may be enhanced. Further still, the thermal fluid may include a gel that is configured to at least partially solidify when disposed in the gap 118. Thus, the thermal fluid may also at least partially block or restrict movement of the sensing device 104 with respect to the mounting tube 102.

Figure 6:
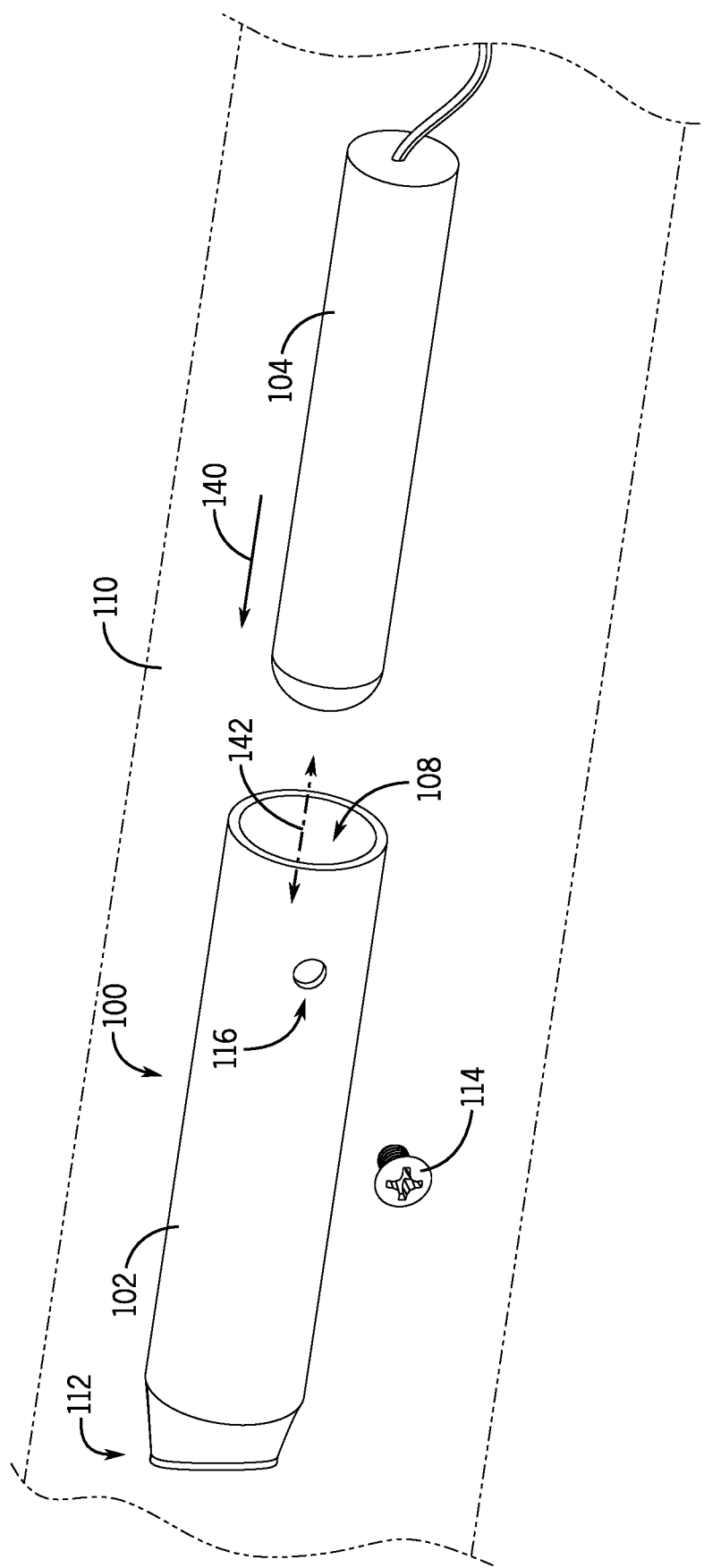
FIG. 6 is an exploded perspective view of an embodiment of the sensor well of FIG. 5, in accordance with an aspect of the present disclosure.

FIG. 6 is an exploded perspective view of an embodiment of the sensor well 100 of FIG. 5. As shown in the illustrated embodiment of FIG. 6, the sensing device 104 may be slidably inserted into the opening 108 of the mounting tube 102. The pinched end 112 of the mounting tube 102 may block or restrict movement of the sensing device 104 in a direction 140 along an axis 142 of the opening 108, or otherwise restrict movement of the sensing device 104 with respect to a central axis of the mounting tube 102. In other words, the pinched end 112 is configured to provide an indication of when the sensing device 104 is in a mounted or operating position within the mounting tube 102. Once the sensing device 104 is positioned within the mounting tube 102, the fastener 114 may be disposed within the opening 116 and tightened against the sensing device 104 to secure the sensing device 104 within the opening 108, and thus, to the component 110. Further, the thermal fluid may be disposed within the gap 118 before the sensing device 104 is disposed in the opening 108, after the sensing device 104 is disposed in the opening 108 but before the fastener 114 is tightened against the sensing device 104, or after the sensing device 104 is disposed in the opening 108 and after the fastener 114 is tightened against the sensing device 104.

Figure 7:
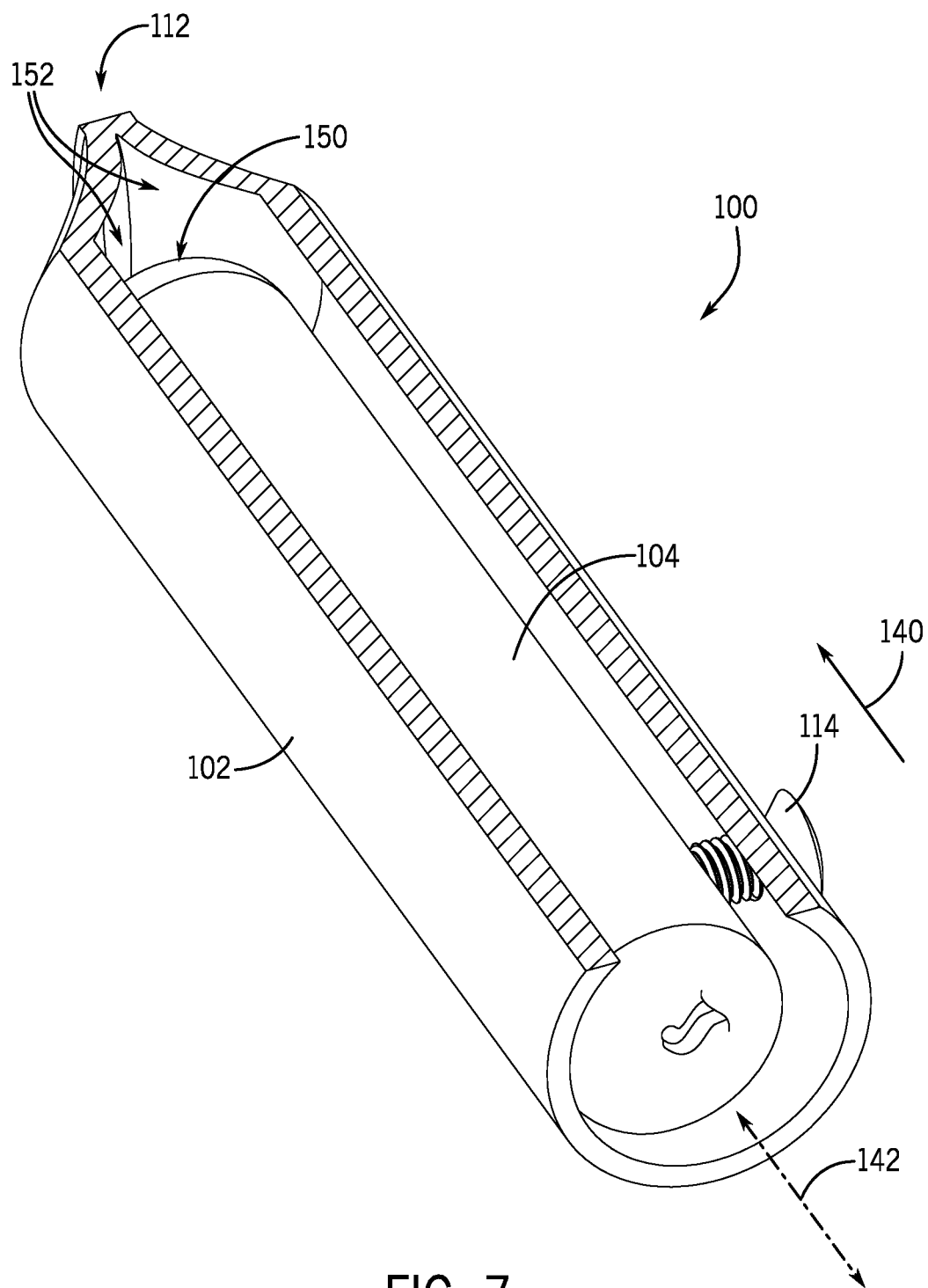
FIG. 7 is a cut away perspective view of an embodiment of the sensor well of FIGS. 5 and 6, in accordance with an aspect of the present disclosure.

FIG. 7 is a cut away perspective view of an embodiment of the sensor well 100 of FIGS. 5 and 6. As shown in the illustrated embodiment of FIG. 7, an end 150 of the sensing device 104 may abut the pinched end 112 of the mounting tube 102. In some embodiments, the pinched end 112 of the mounting tube 102 may be formed via a crimping device or another suitable tool. The pinched end 112 may be sealed or the pinched end 112 may include an opening extending therethrough. In any case, inner surfaces 152 of the pinched end 112 may block or restrict movement of the sensing device 104 in the direction 140 along the axis 142, or otherwise restrict axial movement of the sensing device 104 with respect to a central axis of the mounting tube 102, thereby enabling retention of the sensing device 104 within the mounting tube 102.

Figure 8:
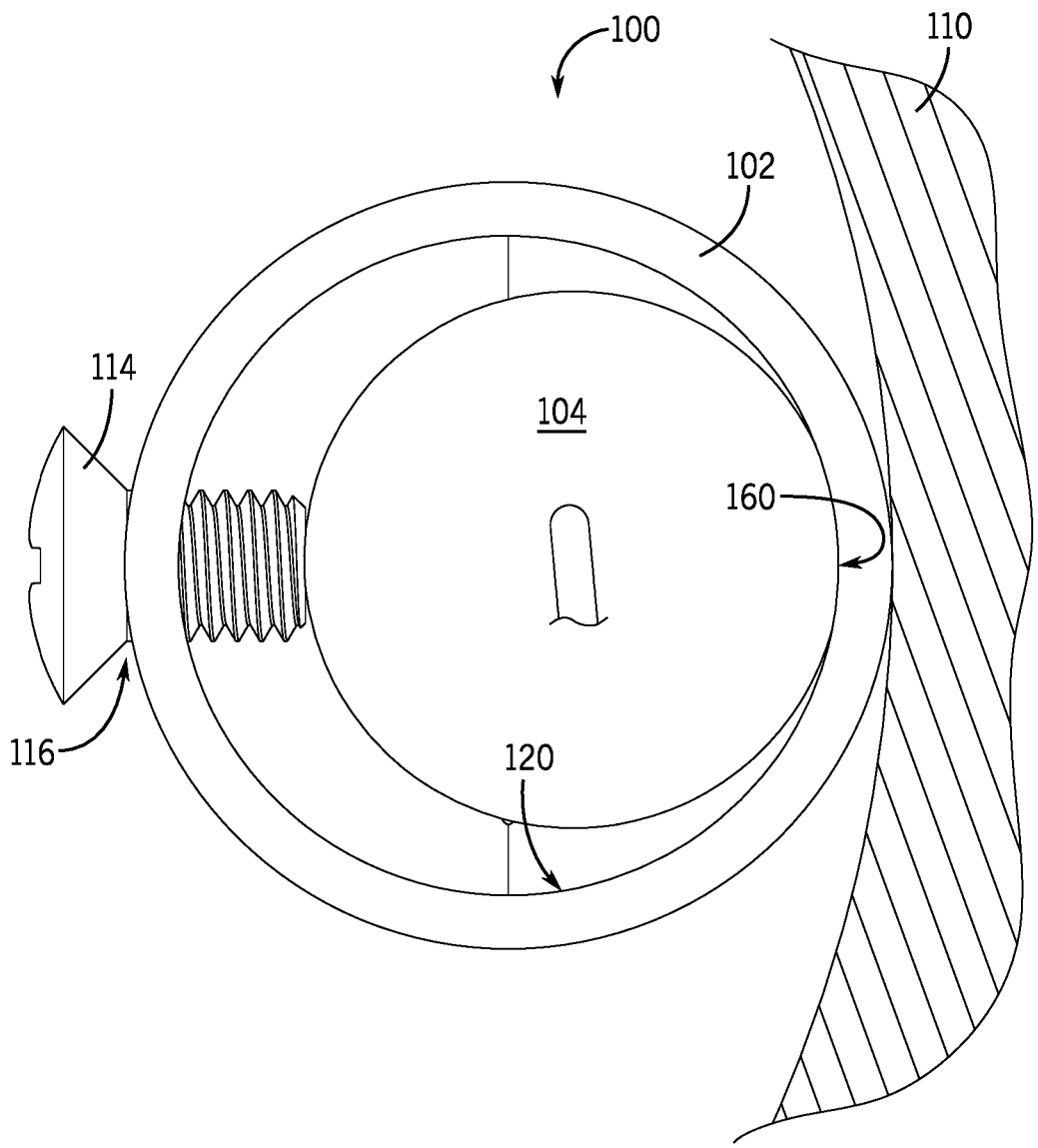
FIG. 8 is an elevation view of an embodiment of the sensor well of FIGS. 5-7, in accordance with an aspect of the present disclosure.

FIG. 8 is an elevation view of an embodiment of the sensor well 100 of FIGS. 5-7. As shown in the illustrated embodiment of FIG. 8, the fastener 114 extends through the opening 116 and contacts the sensing device 104. In some embodiments, the sensing device 104 contacts a portion 160 of the inner surface 120 of the mounting tube 102. The portion 160 of the inner surface 120 of the mounting tube 102 may be positioned proximate to the component 110, such that the sensing device 104 is positioned and secured within the mounting tube 102 as close to the component 110 as possible. As such, a position of the sensing device 104 facilitates thermal energy transfer between the component 110, or a fluid flowing through the component 110, and the sensing device 104, such that the sensing device 104 may accurately and effectively provide feedback indicative of operating parameters of the component 110 to the control system 106.

Figure 9:
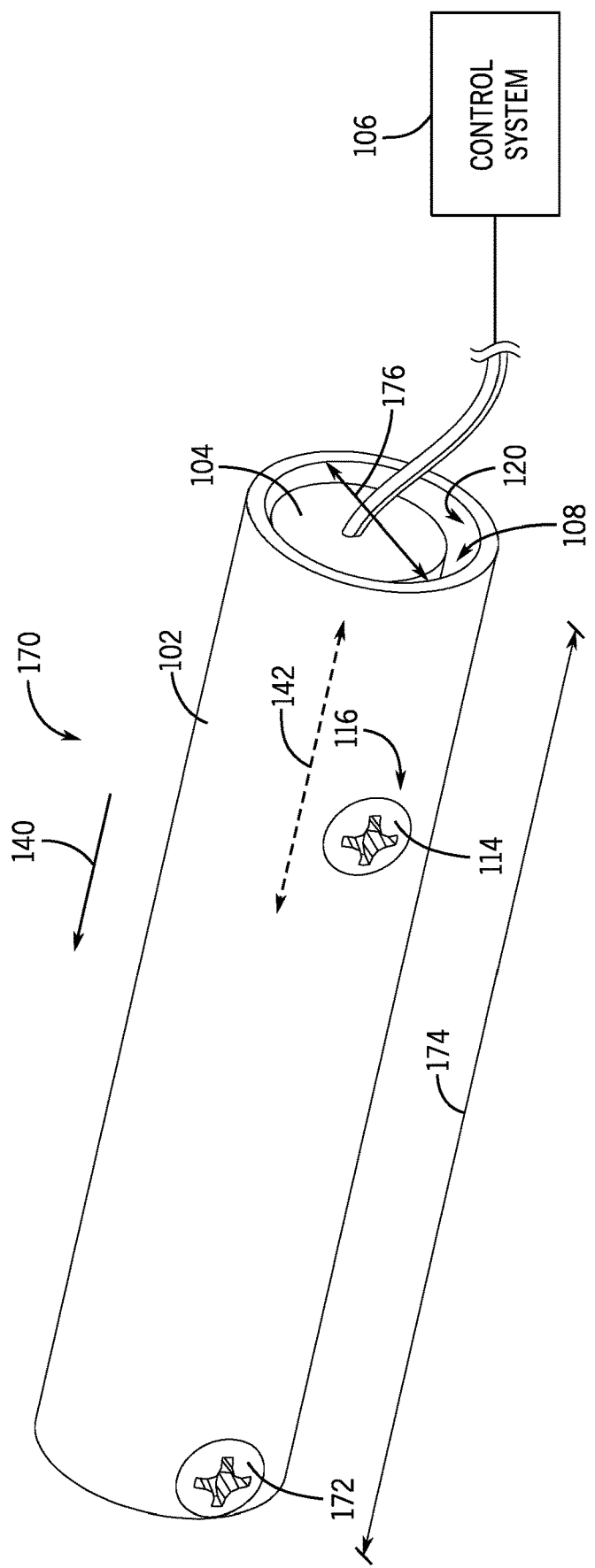
FIG. 9 is a perspective view of an embodiment of a sensor well for the systems of FIGS. 1-3, in accordance with an aspect of the present disclosure.

FIG. 9 is a perspective view of an embodiment of a sensor well 170 that includes an additional fastener 172 extending through the mounting tube 102 in place of the pinched end 112. For example, the fastener 172 may be utilized to block or restrict movement of the sensing device 104 in the direction 140 along the axis 142, or otherwise restrict axial movement of the sensing device 104 with respect to a central axis of the mounting tube 102. Accordingly, the opening 108 of the mounting tube 102 may extend throughout a length 174 of the mounting tube 102. In other words, the inner surface 120 of the mounting tube 102 may include a substantially constant diameter 176 along the length 174 of the mounting tube 102. In any case, the fastener 114 may also be extended through the opening 116 to further secure the sensing device 104 within the mounting tube 102 and/or to block or restrict movement of the sensing device 104 with respect to the mounting tube 102.

Figure 10:
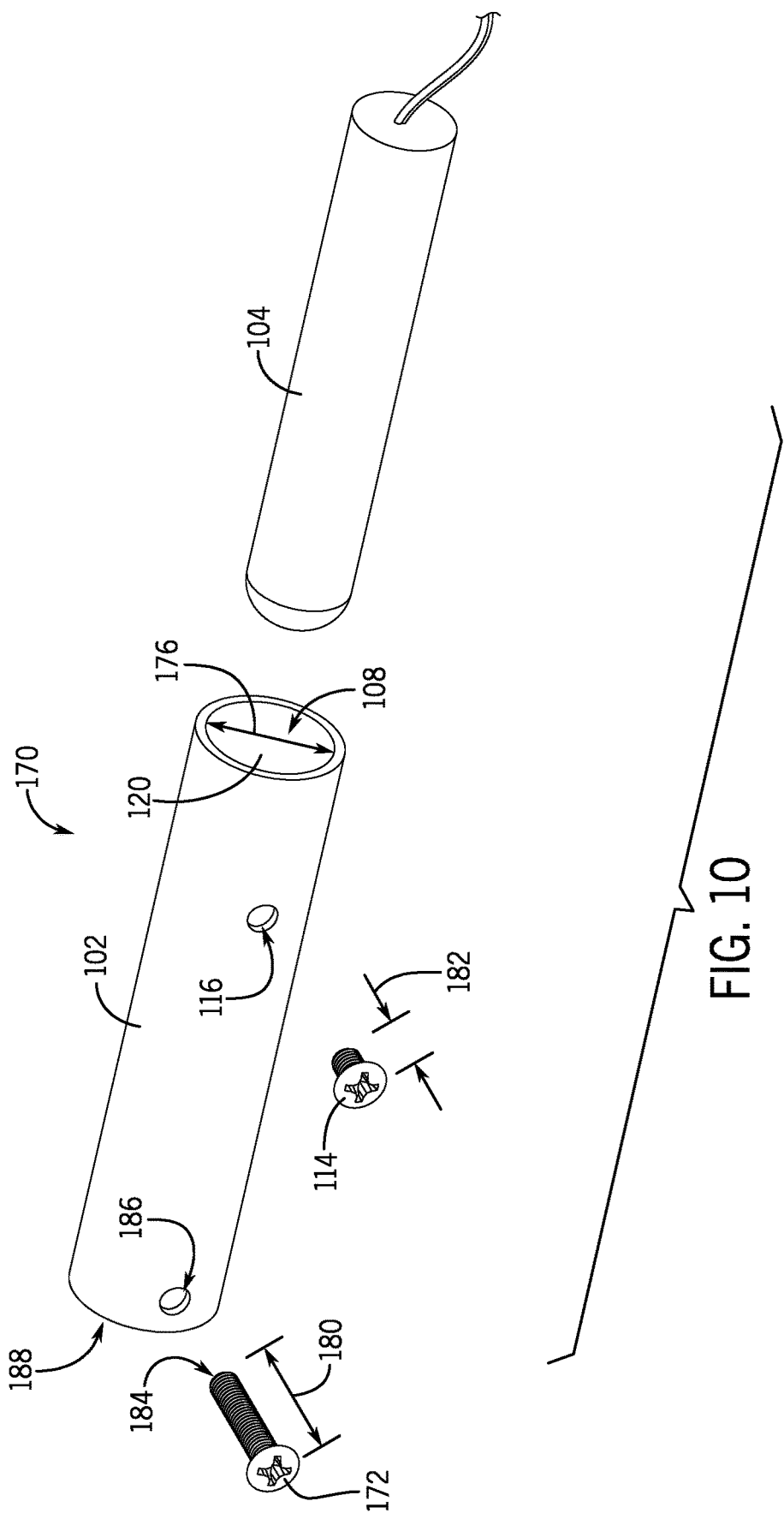
FIG. 10 is an exploded perspective view of an embodiment of the sensor well of FIG. 9, in accordance with an aspect of the present disclosure.

FIG. 10 is an exploded perspective view of an embodiment of the sensor well 170 of FIG. 9. As shown in the illustrated embodiment of FIG. 10, the additional fastener 172 includes a length 180 that is greater than a length 182 of the fastener 114. In some embodiments, the length 180 of the additional fastener 172 may be predetermined, such that the additional fastener 172 extends throughout the entire diameter 176 of the opening 108, and an end 184 of the additional fastener 172 contacts the inner surface 120 of the mounting tube 102. The additional fastener 172 may be disposed in an additional opening 186 that is proximate to an end 188 of the mounting tube 102. In some embodiments, the additional opening 186 may include threads that are configured to engage with threads of the additional fastener 172. As such, the additional fastener 172 may be secured within the opening 186 via engagement between the threads of the fastener 172 and the threads of the opening 186. In other embodiments, another opening may be disposed on an opposite side of the mounting tube 102, such that the length 180 of the additional fastener 172 is greater than the diameter 176 of the opening 108. A nut or other securement device may then be threaded to onto a portion of the additional fastener 172 extending from the additional opening to secure the additional fastener 172 within the opening 186.

Figure 11:
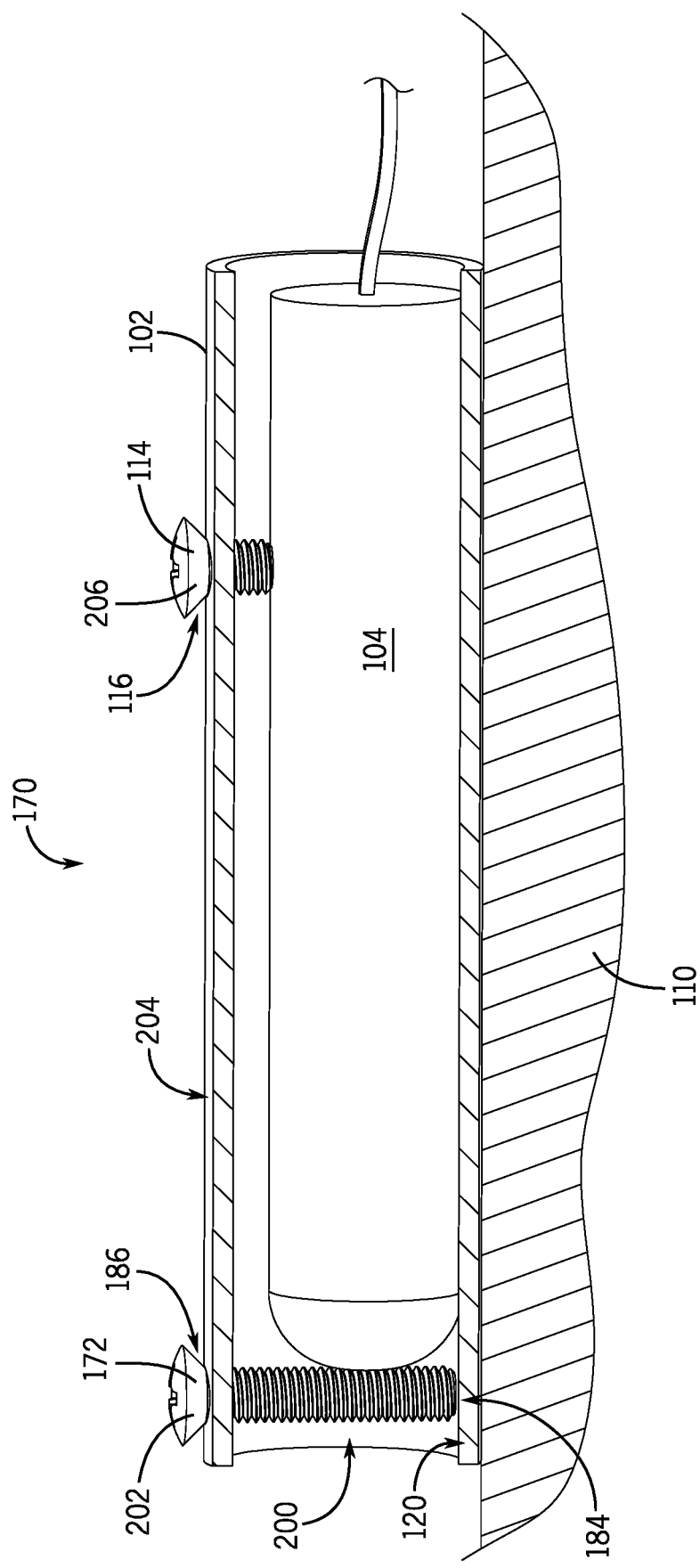
FIG. 11 is a cross-section of an embodiment of the sensor well of FIGS. 9 and 10, in accordance with an aspect of the present disclosure.
Figure 12:
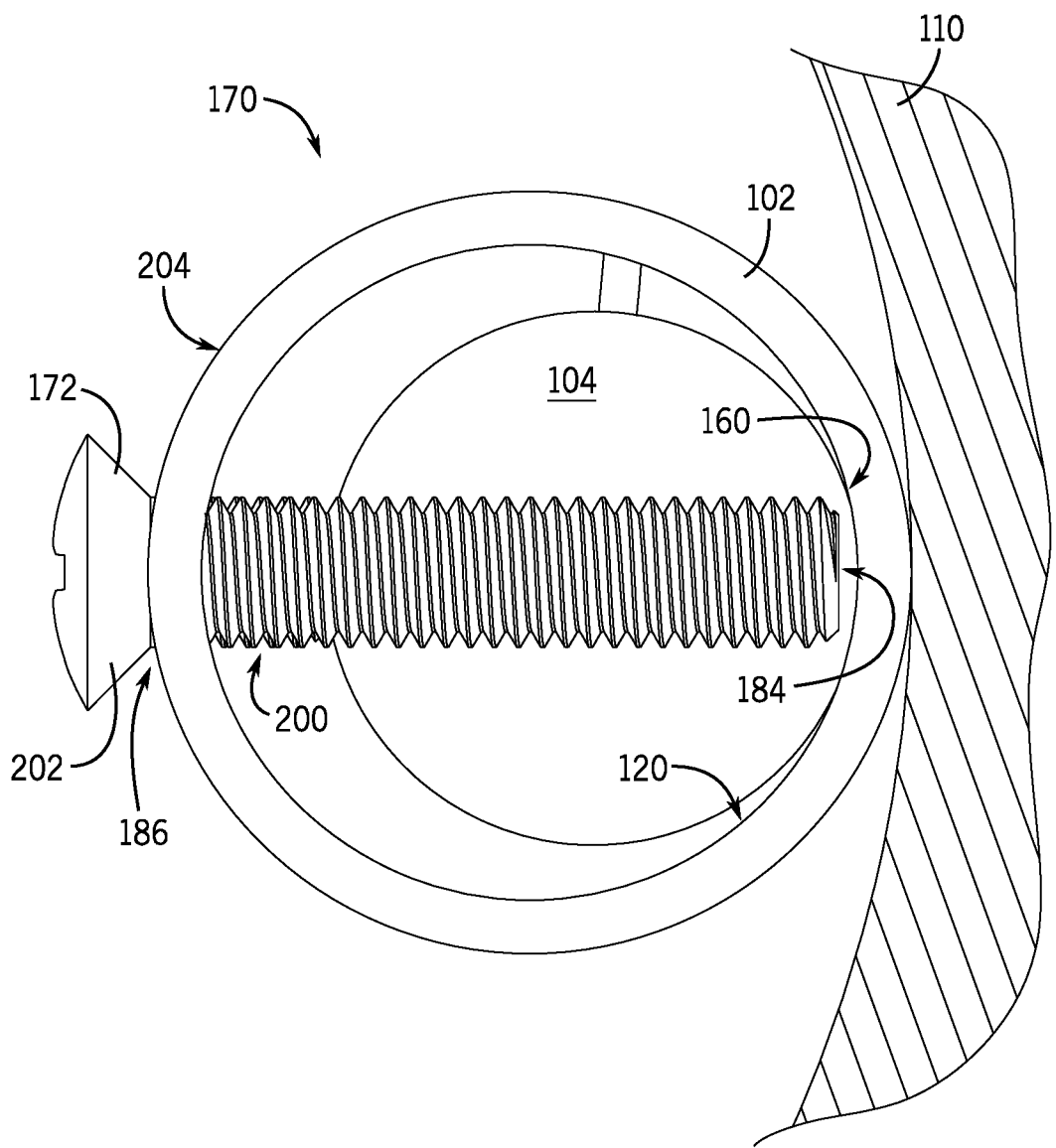
FIG. 12 is an axial view of an embodiment of the sensor well of FIGS. 9-11, in accordance with an aspect of the present disclosure.

FIG. 11 is a cross-section of an embodiment of the sensor well 170 of FIGS. 9 and 10, illustrating the additional fastener 172 in an operating or assembled position 200. Additionally, FIG. 12 is an axial view of an embodiment of the sensor well 170 of FIGS. 9-11. FIGS. 11 and 12 illustrate the additional fastener 172 is in the operating or assembled position 200. For example, a head 202 of the fastener 172 is disposed proximate to an outer surface 204 of the mounting tube 102 that surrounds the opening 186. Further, the end 184 of the additional fastener 172 is disposed proximate to the inner surface 120 of the mounting tube 102. Additionally, the fastener 114 includes a head 206 that is also configured to be disposed adjacent to the outer surface 204 of the mounting tube 102. As discussed above, the fastener 114 secures the sensing device 104 within the mounting tube 102. In some embodiments, the sensing device 104 contacts the inner surface 120 at the portion 160 positioned closest to the component 110. Accordingly, the sensing device 104 may provide accurate and effective feedback to the control system 106.

Figure 13:
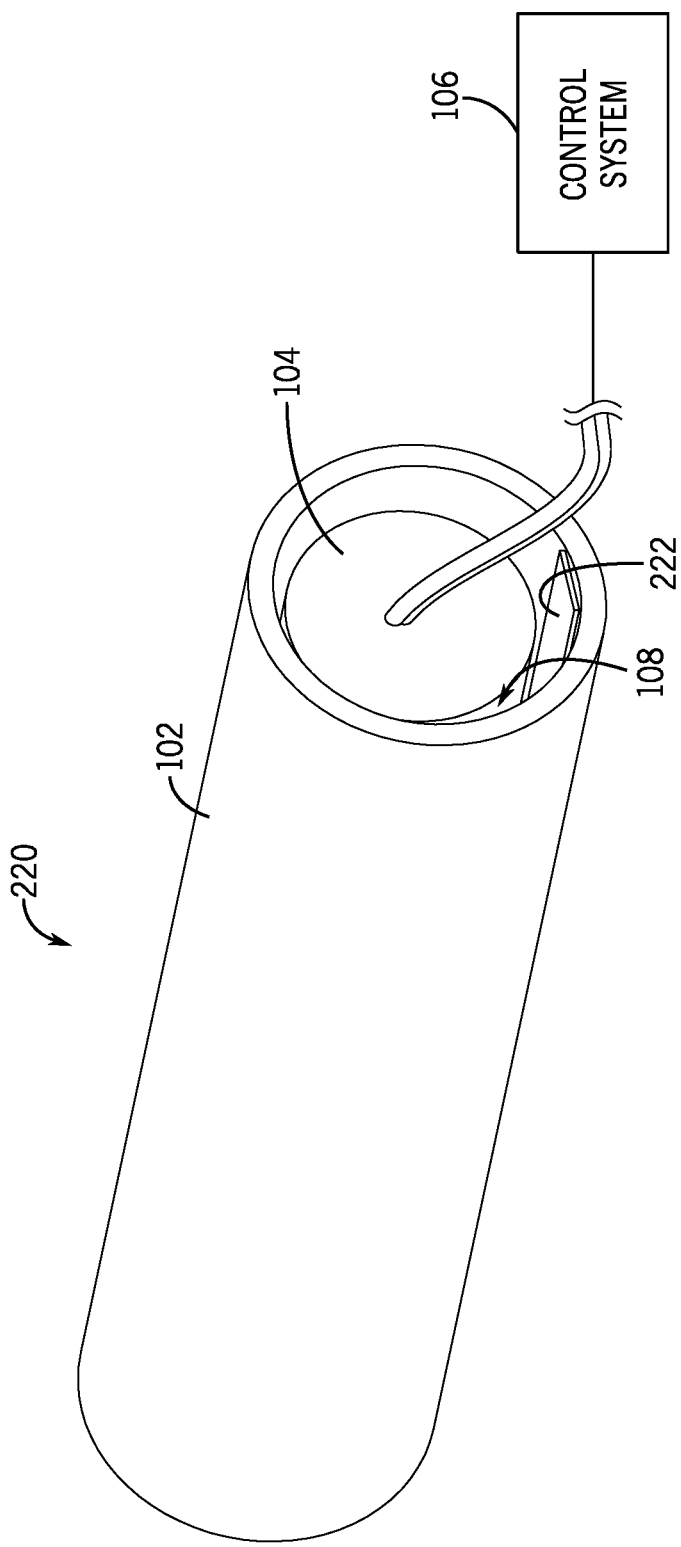
FIG. 13 is a perspective view of an embodiment of a sensor well for the systems of FIGS. 1-3, in accordance with an aspect of the present disclosure.

FIG. 13 is perspective view of an embodiment of a sensor well 220 that includes a clamp 222 configured to block or restrict movement of the sensing device 104 with respect to the mounting tube 102. As such, the sensor well 220 may not include the pinched end 112, the fastener 114, and/or the additional fastener 172. As such, the clamp 222 may facilitate assembly of the sensor well 220 without the use of traditional fasteners that are tightened or inserted into the mounting tube 102 to maintain a position of the sensing device 104.

Figure 14:
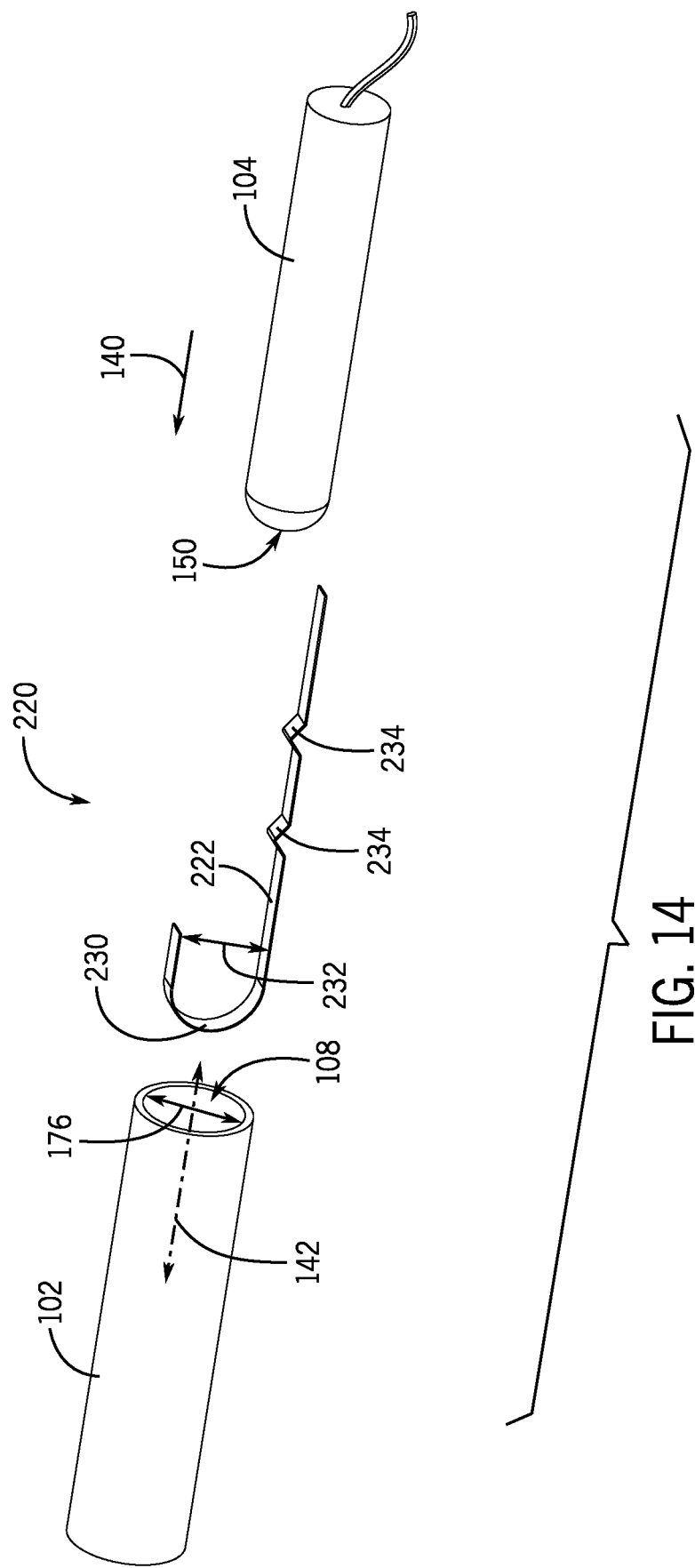
FIG. 14 is an exploded perspective view of an embodiment of the sensor well of FIG. 13, in accordance with an aspect of the present disclosure.

FIG. 14 is an exploded perspective view of an embodiment of the sensor well 220 of FIG. 13. As shown in the illustrated embodiment of FIG. 14, the clamp 222 includes a curved portion 230 configured to at least partially conform to the end 150 of the sensing device 104. For instance, a shape of the end 150 of the sensing device 104 is substantially similar to a shape formed by the curved portion 230, such that the curved portion 230 conforms to the shape of the end 150 of the sensing device 104. As such, the curved portion 230 is configured to block or restrict movement of the sensing device 104 in the direction 140 along the axis 142, or otherwise restrict axial movement of the sensing device 104 with respect to a central axis of the mounting tube 102. For example, the curved portion 230 of the clamp 222 may include a height 232 that is greater than the diameter 176 of the opening 108. Accordingly, the clamp 222 may be manipulated, such as squeezed or compressed, to insert the clamp 222 and the sensing device 104 into the opening 108. The clamp 222 may thus include a radially outward bias toward the inner surface 120, such that a position of the clamp 222 and the sensing device 104 within the opening 108 is substantially maintained when the clamp 222 is disposed within an interior of the mounting tube 102. While the illustrated embodiment of FIG. 14 shows the curved portion 230 having a shape that conforms to the shape of the end 150 of the sensing device 104, in other embodiments, the curved portion 230 may include bent corners that form a box shape. In any case, the curved portion 230 may include any suitable shape that is configured to receive the sensing device 104 and that restrict movement of the sensing device 104 in the direction 140 along the axis 142.

The clamp 222 also includes protrusions 234 that are configured to further block or restrict movement of the sensing device 104 with respect to the clamp 222. The protrusions 234 may direct the sensing device 104 toward the inner surface 120 of the mounting tube 102 and enable the sensing device 104 to remain substantially stationary at an installed or assembled position within the mounting tube 102. While the illustrated embodiment of FIG. 14 shows the clamp 222 having two of the protrusions 234, it should be noted that the clamp 222 may include one, three, four, five, six, seven, eight, nine, ten, or more of the protrusions 234. In some embodiments, the clamp 222 may be formed from a sheet metal material, such as steel or aluminum. In other embodiments, the clamp 222 may be formed from copper or another suitable metallic material that enables the clamp 222 to be biased radially outward and toward the inner surface 120 of the mounting tube 102 when the clamp 222 is disposed within an interior of the mounting tube 102.

Figure 15:
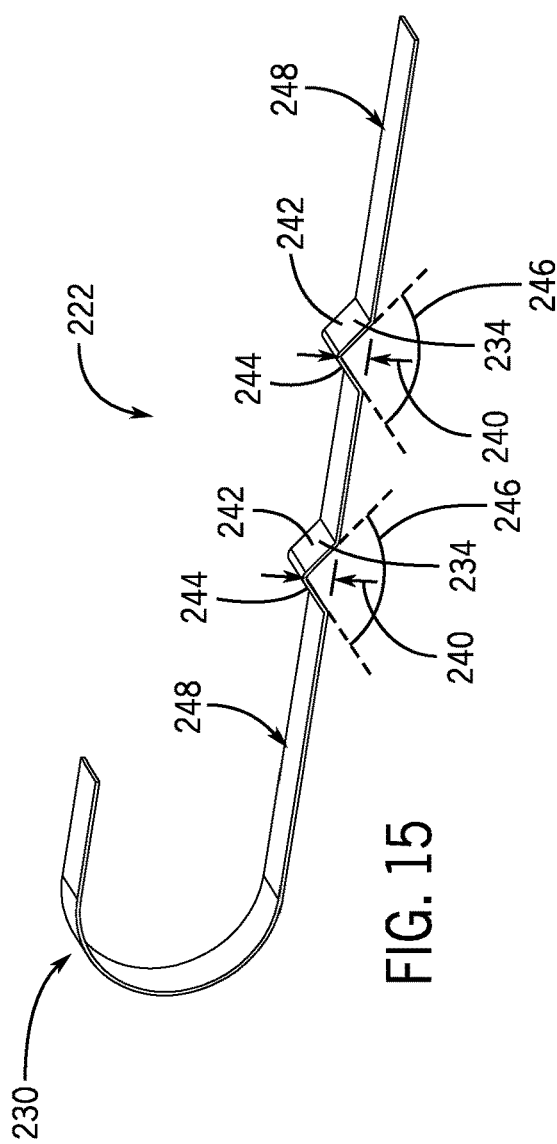
FIG. 15 is a perspective view of an embodiment of a coil configured to hold a sensor in the sensor well of FIGS. 13 and 14, in accordance with an aspect of the present disclosure.

FIG. 15 is a perspective view of an embodiment of the clamp 222 for the sensor well 220 of FIGS. 13 and 14. As shown in the illustrated embodiment of FIG. 15, the clamp 222 includes the curved portion 230 as well as the protrusions 234. The protrusions 234 include a height 240 configured to secure the sensing device 104 in the opening 108 of the mounting tube 102. The protrusions 234 may each include a first portion 242 and a second portion 244 that form an angle 246 with respect to one another. In some embodiments, the protrusions 234 are formed via stamping, punching, or bending a body portion 248 of the clamp 222. In other embodiments, the protrusions 234 may include a substantially arcuate shape or another suitable shape.

Figure 16:
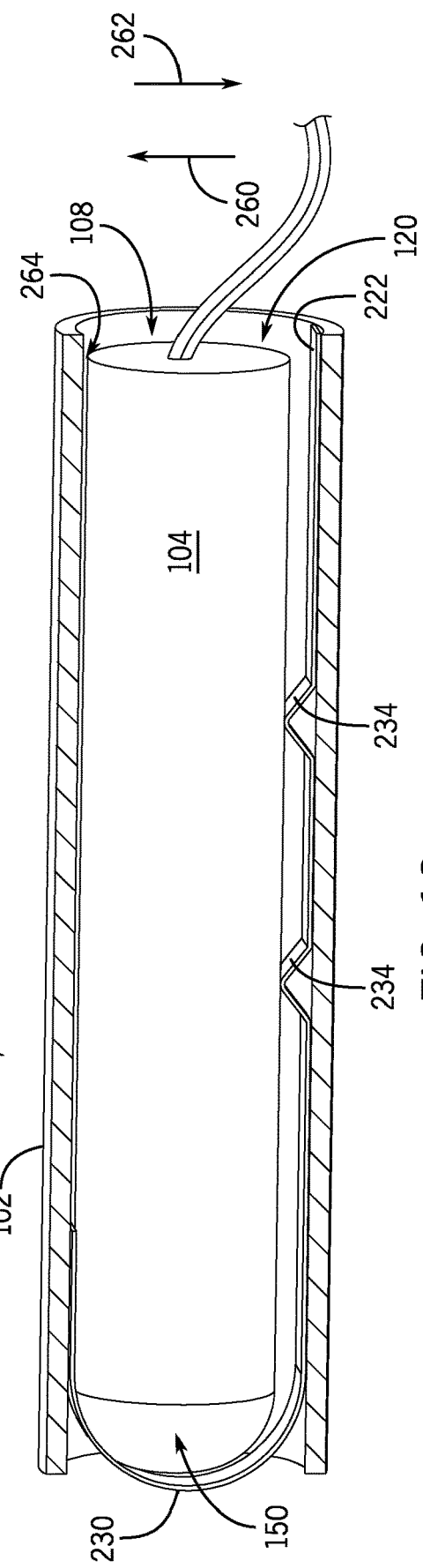
FIG. 16 is a cross-section of an embodiment of the sensor well of FIGS. 13 and 14, in accordance with an aspect of the present disclosure.

FIG. 16 is a cross-section of an embodiment of the sensor well 220 of FIGS. 13 and 14. As shown in the illustrated embodiment of FIG. 16, the end 150 of the sensing device 104 is disposed adjacent to the curved portion 230 of the clamp 222 when the sensing device 104 and the clamp 222 are disposed within the opening 108 of the mounting tube 102 in an assembled position. Further, the protrusions 234 may apply a force to the sensing device 104 in a direction 260 toward the inner surface 120 of the mounting tube 102. In some embodiments, the sensing device 104 contacts the inner surface 120 of the mounting tube 102 as a result of the force applied in the direction 260. In other embodiments, the force applied to the sensing device 104 in the direction 260 acts against a counterforce in a direction 262 applied to the sensing device 104 via the curved portion 230. As such, the force and the counterforce act as a clamp against the sensing device 104 to secure the sensing device 104 within the opening 108. In such embodiments, a gap 264 may be formed between the sensing device 104 and the inner surface 120 of the mounting tube 102.

Figure 17:
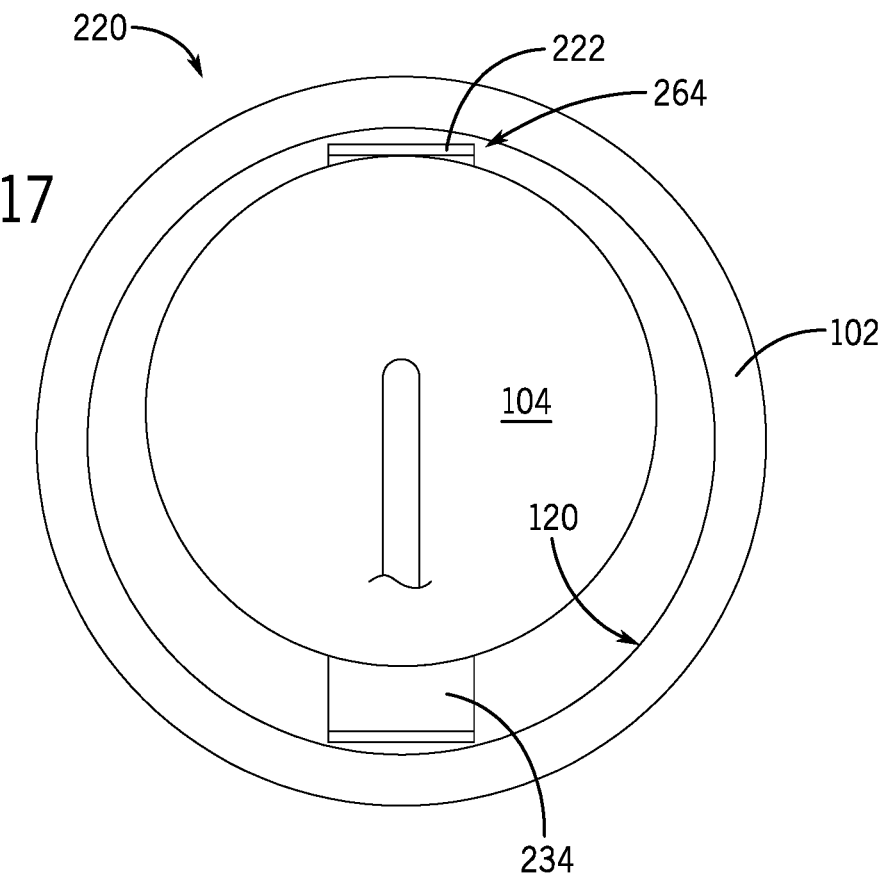
FIG. 17 is an elevation view of an embodiment of the sensor well of FIGS. 13, 14, and 16, in accordance with an aspect of the present disclosure.

For example, FIG. 17 is an elevation view of an embodiment of the sensor well 220 of FIGS. 13, 14, and 16. As shown in the illustrated embodiment of FIG. 17, the gap 264 is formed between the sensing device 104 and the inner surface 120 of the mounting tube 102 via the clamp 222. In other words, the curved portion 230 of the clamp 222 and the protrusions 234 of the clamp 222 directly contact the inner surface 120 of the mounting tube 102 and substantially block contact between the inner surface 120 and the sensing device 104. In some embodiments, any gap formed between the inner surface 120 and the sensing device 104 is filled with the thermal fluid.

Figure 18:
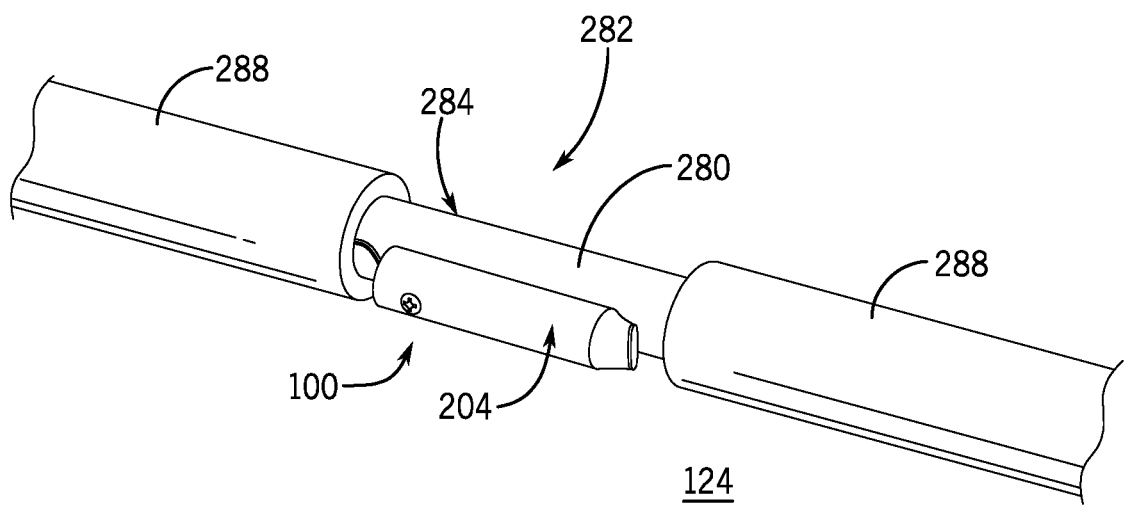
FIG. 18 is a perspective view of an embodiment of the sensor wells of FIGS. 5-17 installed in the systems of FIGS. 1-3, in accordance with an aspect of the present disclosure.

FIG. 18 is a perspective view of an embodiment of one of the sensor wells 100, 170, and/or 220 disposed on a conduit 280, such as a copper pipe or tube, of the HVAC unit 12 and/or the residential heating and cooling system 50. As shown in the illustrated embodiment of FIG. 18, the sensor well 100, 170, and/or 220 is brazed to a portion 282 of the conduit 280, such that the sensing device 104 is configured to provide feedback indicative of an operating parameter of a working fluid flowing through the conduit 280 at the portion 282. For example, thermal energy may be transferred from the working fluid to an outer surface 284 of the conduit 280, from the outer surface 284 of the conduit 280 to the outer surface 204 of the mounting tube 102, from the outer surface 204 of the mounting tube 102 to the inner surface 120 of the mounting tube 102, and from the inner surface 120 of the mounting tube 102 to the sensing device 104. As discussed above, in some embodiments, a thermal fluid or gel may be included within the opening 108 of the mounting tube 102 to facilitate thermal energy transfer between the inner surface 120 of the mounting tube 102 and the sensing device 104. As such, an accuracy and effectiveness of the sensing device 104 may be increased.

In some embodiments, the conduit 280 includes insulation 288 configured to reduce thermal energy transfer from the outer surface 284 of the conduit 280 to the environment 124 surrounding the conduit 280. While not shown in the illustrated embodiment of FIG. 18, the portion 282 of the conduit 280, as well as the sensor well 100, 170, and/or 220, may also be covered in the insulation 288 to further increase an accuracy of the feedback provided by the sensing device 104. In any case, the sensing device 104 may be secured within the mounting tube 102 to reduce interference caused by environmental conditions present in the environment 124 surrounding the conduit 280. Further, the mounting tube 102 may be configured to be coupled to any suitable sized conduit 280. In other words, the mounting tube 102 may not be adjusted to fit a specific diameter of the conduit 280, but rather is simply coupled to the outer surface 284 of the conduit 280. Further still, the sensor well 100, 170, and/or 220 may substantially maintain a position of the sensing device 104 with respect to the portion 282 of the conduit 280, such that the sensing device 104 may provide accurate feedback indicative of the operating condition of the working fluid flowing through the conduit 280.

As set forth above, embodiments of the present disclosure may provide one or more technical effects useful in installation and use of sensors for HVAC systems. For example, embodiments of the present disclosure are directed to enhanced sensor wells that facilitate installation of sensing devices, substantially maintain a position of the sensing devices with respect to a component of the HVAC system, and protect the sensing devices from ambient conditions that may interfere with the sensing device feedback. In some embodiments, the sensor well includes a pinched end, fasteners, a clamp, and/or thermal fluid that are utilized to secure the sensing device within a mounting tube of the sensor well. The mounting tube may be secured to a component of the HVAC system, such that a position of the sensing device is substantially maintained with respect to the component of the HVAC system. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A sensor well system, comprising:
a sensor;
a clip comprising a width, a curved end portion, a second end, and a protrusion, wherein the sensor is configured to abut against the curved end portion, and the protrusion is between the curved end portion and the second end of the clip; and
a mounting tube having an inner diameter, wherein the width of the clip fits within the inner diameter of the mounting tube, and wherein the protrusion is configured to extend away from an inner surface of the mounting tube.

2. The sensor well system of claim 1, wherein the curved end portion of the clip is configured to bias radially outward toward the inner surface of the mounting tube when the clip is disposed in an interior of the mounting tube.

3. The sensor well system of claim 1, wherein the protrusion of the clip is configured to apply a force to the sensor in a direction toward the inner surface of the mounting tube.

4. The sensor well system of claim 3, wherein the curved end portion of the clip is configured to apply an additional force to the sensor in an additional direction, opposite the direction, to secure the sensor within the mounting tube.

5. The sensor well system of claim 1, wherein the clip is formed from a band of sheet metal material.

6. The sensor well system of claim 1, wherein the curved end portion of the clip is configured to conform to a shape of an end portion of the sensor.

7. The sensor well system of claim 6, wherein the curved end portion is configured to continuously abut the sensor to restrict axial movement of the sensor with respect to a central axis of the mounting tube in an assembled configuration of the sensor well system.

8. The sensor well system of claim 1, wherein the mounting tube comprises a copper material.

9. The sensor well system of claim 8, wherein the mounting tube is configured to be brazed to a copper tube of a heating and cooling system.

10. The sensor well system of claim 9, wherein the sensor comprises a temperature sensor configured to provide feedback indicative of a temperature of a working fluid flowing through the copper tube of the heating and cooling system to a control system.

11. The sensor well system of claim 1, comprising a thermal fluid disposed in a gap between the inner surface of the mounting tube and the sensor.

12. The sensor well system of claim 11, wherein the thermal fluid is configured to facilitate thermal energy transfer between a component of a heating and cooling system, the mounting tube, and the sensor.

13. The sensor well system of claim 11, wherein the thermal fluid is a gel configured to further secure the sensor within the mounting tube.

14. The sensor well system of claim 11, wherein the thermal fluid is configured to at least partially thermally isolate the sensor from an ambient environment surrounding the sensor well system.

15. A sensor well system, comprising:
   a mounting tube comprising an inner surface and an inner diameter;
   a sensor configured to be disposed within the mounting tube in an assembled configuration of the sensor well system; and
   a clip configured to be disposed within the mounting tube in the assembled configuration of the sensor well system, wherein the clip comprises a body portion, a curved end portion extending from the body portion, and a protrusion formed in the body portion,
   wherein the curved end portion receives and abuts an end of the sensor in the assembled configuration.

16. The sensor well system of claim 15, wherein the body portion and the protrusion are disposed within the mounting tube in the assembled configuration.

17. The sensor well system of claim 15, wherein the curved end portion is configured to restrict axial movement of the sensor within the mounting tube.

18. The sensor well system of claim 15, wherein the curved end portion overlaps a central axis of the mounting tube in the assembled configuration.

19. A sensor well system, comprising:
   a mounting tube;
   a sensor disposed within the mounting tube; and
   a clip disposed within the mounting tube, wherein the clip comprises a curved end portion abutting the sensor, a body portion extending from the curved end portion to a second end of the clip opposite the curved end portion, and a protrusion formed in the body portion between the curved end portion and the second end.

20. The sensor well system of claim 19, wherein the mounting tube comprises an inner surface, and the protrusion extends away from the inner surface to engage with the sensor and bias the sensor in a direction toward the inner surface.

21. The sensor well system of claim 19, wherein the curved end portion receives an end of the sensor and abuts the end of the sensor.

22. The sensor well system of claim 21, wherein the curved end portion extends across and overlaps a central axis of the mounting tube.

23. The sensor well system of claim 21, wherein the curved end portion conforms to a shape of the end of the sensor.

24. The sensor well system of claim 23, wherein the end of the sensor is curved.

* * * * *